April 4, 1967   M. F. HOKANA   3,312,329
CONVEYOR FEEDER SYSTEM

Filed March 24, 1964   2 Sheets-Sheet 1

INVENTOR
MARSHALL F HOKANA

BY *Mason, Mason & Albright*
ATTORNEYS

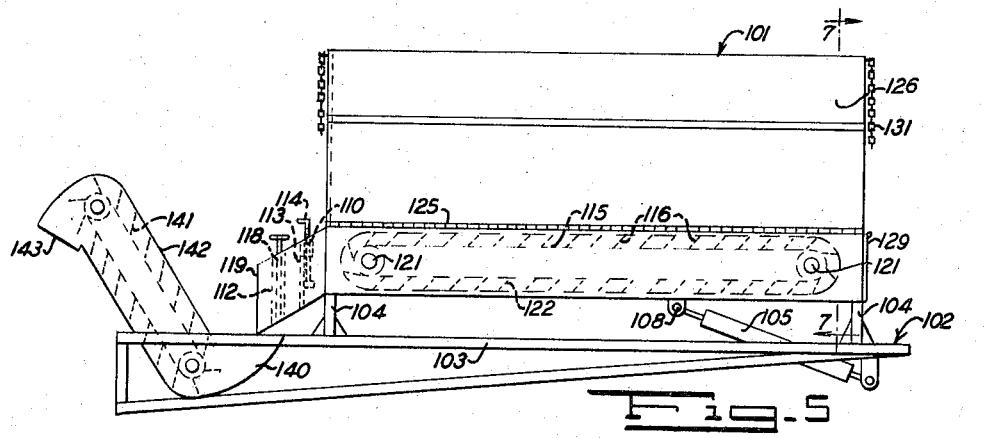
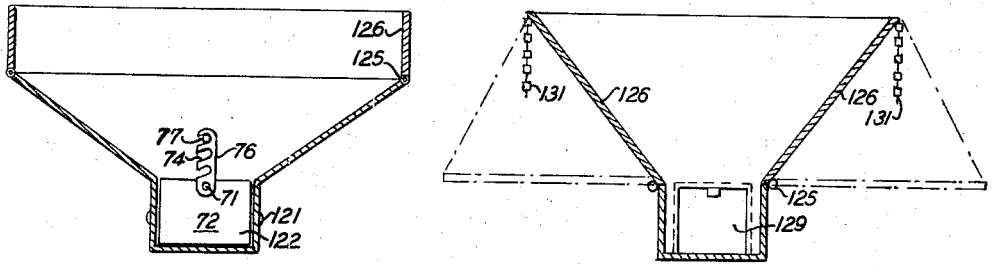
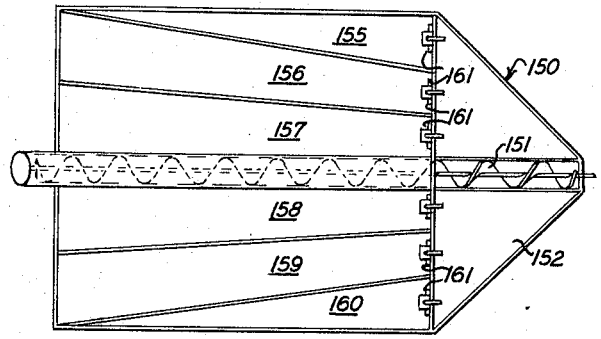

United States Patent Office 3,312,329
Patented Apr. 4, 1967

3,312,329
CONVEYOR FEEDER SYSTEM
Marshall F. Hokana, Ellendale, N. Dak. 58436
Filed Mar. 24, 1964, Ser. No. 354,411
4 Claims. (Cl. 198—64)

This invention relates to a feed processing assembly and particularly to means for storing and supplying milled grain, forage, additives, supplements and other feed materials in the proper mixed amounts. More particularly, this invention relates to a gravity feed system and processing assembly that stores and dispenses measured amounts of processed feed components with a minimum amount of manual effort on the part of the operator.

Modern farm methods for feeding livestock and poultry provide for numerous formulas. Many ingredients are necessary to fill formula specifications and it is essential that the proper proportions of these ingredients be measured, mixed and dispensed. It will also be appreciated that feed formulas constantly change as livestock grows and produce.

The present practice of handling and mixing feeds is to perform much of the loading unloading by hand. In many instances two or more men are required to service and process the feed through the milling machinery. The milling machinery usually includes a hammer mill and bagging facilities. Moreover, much of this manual work involves lifting, shoveling and carrying heavy loads and the farmer is forced to work in a dusty environment.

Another disadvantage in present practices is that it is not possible to control the exact amounts of feed to be mixed nor do present practices include means for storing feed in an elevated collector that can be adjusted to the desired height to receive and dispense the processed and mixed feed to various containers.

Accordingly, it is an object of the present invention to provide means for storing all of the necessary components that comprise the proper food and nourishment for livestock, poultry and other farm animals.

It is another object of the present invention to provide means for blending, milling, mixing and dispensing stored feed components of all kinds.

It is still another object to provide a gravity feed system including apparatuses capable of simultaneously dispensing the proper amounts of various feed components, which system and apparatuses have a minimum of moving parts.

These and other objects are accomplished in the form of the invention illustrated in the appended drawings.

FIGURE 6 is a sectional view of a modified feed tank similar to that shown in FIGURE 5 and with modified gate means;

FIGURE 7 is a sectional view taken along lines 7—7 in FIGURE 5 to illustrate the hinged sides swung out to facilitate loading;

FIGURE 8 is a sectional view of a fourth gravity feed tank with screw conveyor means shown in phantom which tank can be substituted for the other tanks in the assembly; and FIGURE 9 is a top plan view of the FIGURE 8 tank showing the individual compartments separated by dividers.

Figure 1:
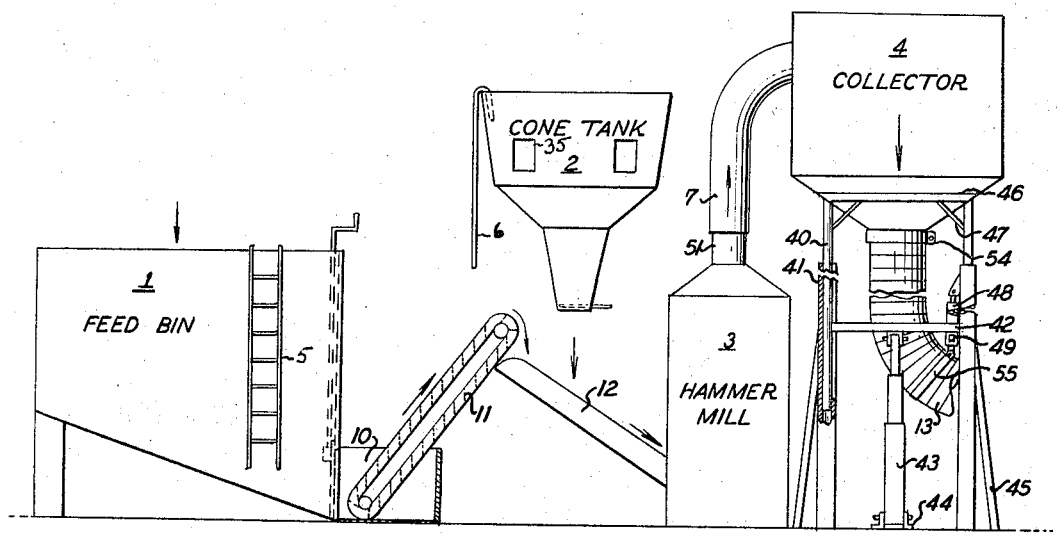
FIGURE 1 is a side elevation of a preferred feed processing assembly with the gravity feed tank in operative position.

One arrangement of the feed processing assembly is shown in FIGURE 1 wherein 1 is a gravity feed tank comprising a compartmented bin with an inclined bottom that terminates in a plurality of trap doors or gates. The gates lead to a receiving area 10 in which an endless conveyor 11 is positioned for removing the dispensed feed to inclined chute 12. A second gravity feed tank comprising a cone tank 2 is also divided into a plurality of compartments containing various feed components. Observation windows 35 permit visual inspection of the interior of tank 2 and the interiors of tanks 1 and 2 are accessible by means of removable ladders 5 and 6. The feed components are gravity fed through gate means and flow into the lower funnel section provided with sliding trap doors which can be opened to allow the proper measured amounts of the components to fall to chute 12 for grinding in hammer mill 3. The mill can be a hammer mill, a burr mill or a roller mill and is of conventional design for blending and processing feed. The exit of the mill is fitted to one end of conduit 7 for transporting the ground feed to collector 4.

Figure 2:
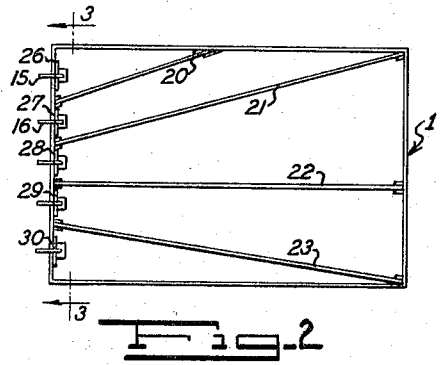
FIGURE 2 is a top plan view of the gravity feed tank illustrating the divided compartments.
Figure 3:
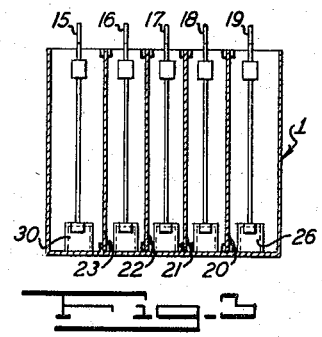
FIGURE 3 is a front elevation of the tank of FIGURE 2 showing the forward side of the tank with sliding gate means.

FIGURE 2 shows the bin 1 in plan view, having a series of separators 20, 21, 22 and 23 arranged longitudinally. The number of separators can vary since they can be easily removed from the channeled slots arranged on the sides and bottom of the bin. A series of gate means including hand cranks 15, 16, 17, 18 and 19, and sliding gate doors 26, 27, 28, 29 and 30 are provided at one end of the bin so that material can be individually and simultaneously dispensed by opening the appropriate gate or gates.

A selected rate of flow is achieved by raising or lowering the gate doors intermediate their full open or shut positions. Cone tank 2 operates in a similar manner having removable separators and gate means for passing feed material from the funnel-shaped bottom 9. The configuration of the cone tank is designed to fit certain processing mills where space is limited.

Collector 4 includes a frame having four slidable rods 40 that are received in slotted sleeves 41 and joined by bars 42. Bars 42 are raised and lowered by means of hydraulic jacks 43 having feet 44. The entire frame and collector are supported by braces 45. Rods 40 raise or lower the collector through brackets 46 and brace 47. Flexible tube 13 is held to the bottom of the collector by collar 54 and made adjustable by means of telescoping rod 48, pivotally connected to collar 55, which rod can be secured in any position by lock 49.

When it is desired to raise or lower the collector, hydraulic jack 43 raises the collector together with attachments. Conduit 7 is slidable relative to tube 51. The hydraulic controlled collector can be raised or lowered to accurately dispense feed into a twelve-foot high feed bin, a four-foot high wagon or other receptacle. It is thus apparent that the collector can be lowered to be received within a building and loaded with the appropriate feed mix. Thereafter, the collector can be raised sufficiently high to load a ten-foot high feed box. Also, the elevated collector permits other mechanisms to be positioned conveniently close to its frame.

The collector shown is cone-shaped with an opening at or near the top with a part that separates the forced air and mist feed and permits the air to escape from the top. The feed comes into contact with the cone-shaped funnel and falls down tube 13 by gravity.

An advantage of the collector is that it can be raised or lowered without accompanying shut-down of the machinery or interruption of the processing of feed. Similarly, flexible tube 13 can be adjusted and moved without disrupting operation of the assembly.

A mill mechanism 3 is provided for receiving and milling mixed feed and thereafter delivering the feed to collector 4. Preferably the mechanism is a hammer mill, although under some circumstances a burr or roller mill can be used. Many grinder units in current use grind in one operation and the farmer must mix in a further operation. In the present invention the feed processing assembly includes means for delivering mixed feed including the desired amounts of forage, supplements and grain to the mill. The mill mechanism should be one that can be run from a power attachment to a tractor. A suitable hammer mill rotating at approximately 2200 revolutions per minute creates sufficient force to force the milled feed to the top of the collector 4. The mill will have the conventional arrangement of hammers and fans. Bulk feed and grain upon entering the mill is struck and pulverized sufficiently to pass a screen of predetermined size. By means of the gravity feed tank or bin, controlled mixtures are truly blended and ground. The mixed feed is urged by the whirling hammers and propelled by fans to even more thoroughly mix the feed particles which are concurrently forced upwardly through conduit 7 to collector 4.

Figures 4, 5:
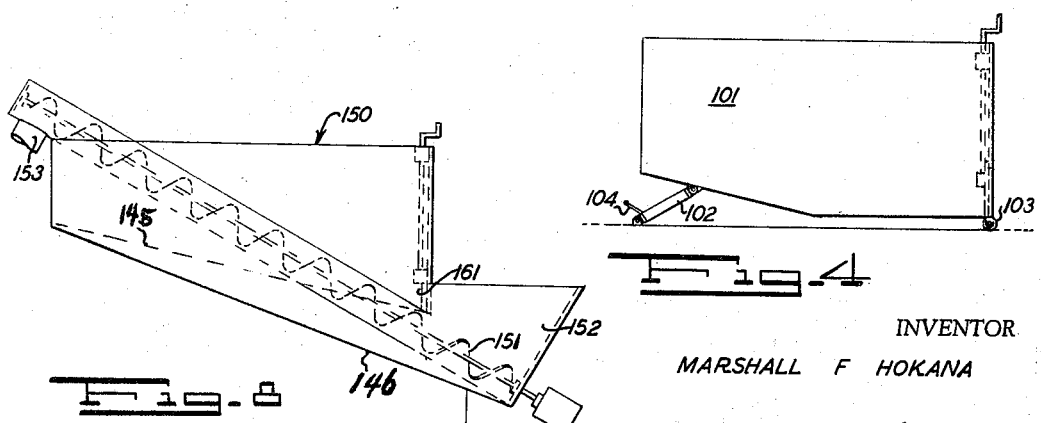
FIGURE 4 is a side elevation of a second gravity feed tank with hydraulic jack means, which tank is otherwise similar to the FIGURES 1–3 tank and is adapted for use in the assembly.
FIGURE 5 is a side elevation of a third gravity feed tank having conveyor means shown in phantom, which tank can also be used in the assembly.

In FIGURE 4, bin 101 is hinged to support 105 and has a hydraulic lifting jack 102 with a fluid hose connection 104. The bottom of the bin is inclined for half its length at 106 but otherwise the tank is similar to bin 1. Both bin 1 and bin 101 can be provided with removable sides so that a truck, tractor or trailer can be conveniently and directly unloaded. The hydraulic lift bears on the bottom of bin 101 at a point remote from the hinged end so that a loaded bin can be easily raised and lowered.

In FIGURES 5-7 an alternative arrangement is illustrated which also includes a drag chain assembly. The tank is mounted on frame 102 which includes platform 103 on which the tank supports 104 can rest. A conventional hydraulic jack 105 is connected to the lower part of one end of frame 102 and pivoted off center to the bottom of tank 101 at 108. The tank 101 has sides 126 hinged at 125 so that the sides can be lowered to facilitate loading. The sides are provided with chains 131 and can be retained in horizontal position, as shown by broken lines in FIGURE 7. Door 129 is provided to afford access to the chain conveyor mechanism. The conveyor mechanism can be of the same construction as a conventional elevator used to move hay bales and other bulk crop. Endless conveyor 122 is propelled by either shaft 121 which in turn can be powered by a separate gasoline engine or by a tractor power take-off connection. The shafts 121 are mounted in a conventional manner and adjusting means is accessible through door 129. The chains 115 are provided with flights 116 which can be removed or added to so that the desired spacing can be arranged.

The conveyor moves to deposit whole ears of corn as well as bales of hay or fodder to chute 119 which can be closed by either a slide trap door 118 or by a screw-down trap door 113 provided with handle 114 held to the chute. Trap door 118 is fitted into slides 112, shown in broken lines, the door 113 with handle 114 on a threaded shaft is screwed into collar 110 retained at the top of the chute. This arrangement of two doors can be used in the other tanks disclosed herein.

Feed material moved by the conveyor to chute 119 falls down to hopper 140 having a rounded bottom into which projects elevator 141 disposed with tube 142 provided with exit opening 143. Elevator 141 is designed to receive bulk feed from the conveyor and raise the feed material to a point where it is fed to a mill hopper. It will be appreciated that the operator can raise or lower the tanks without having to shut down the mill or other mechanisms. Thus grain and fodder flow speed can be regulated without interruption of the processing of feed. It will also be understood that a portable mill can be positioned on the platform 103 and the platform provided with wheels so that the unit is mobile.

FIGURES 8 and 9 show still another bin 150 having an inclined bottom 145. As shown in FIGURE 9, the bin is divided into compartments 155, 156, 157, 158, 159 and 160 which include a second inclined bottom 146. Feed is dispensed from one or more gates 161 whereupon the materials fall down to receiving area 152. Bin 150 is provided with screw conveyor 151 which is adapted to urge dispensed material upwardly to the opposite end of the bin to be dropped through conduit 153 either to the hammer mill or the area of final destination. Beyond receiving area 152, screw conveyor 151 is enclosed by a casing. It will be appreciated that the conveyor can be positioned below or within the bin.

It is to be understood that the sides of all of the tanks disclosed herein can be extended with supplementary sides and each tank can be provided with top enclosures. Also, the power to run the conveyors and hammer mill can be provided by power take-off means coupled with conventional converting means such as disclosed in U.S. Patents Nos. 2,590,675; 2,982,484; and 2,815,941.

It is to be understood that various arrangements and modifications of the tanks, mill and collector in the assembly can be made. Moreover, all of these components, either individually or collectively, can be mounted on wheels. Thus in FIGURE 1, tank 1 can be mounted on a truck chassis with a conventional dump truck hydraulic jack arrangement and in place of conveyor 11, the hammer mill 3 can be positioned below the sides of the individual compartments so that mixed feed can be fed directly to the mill. Alternatively, the entire assembly of one or two tanks, the mill and collector can be mounted on wheels and transported from the loading area to the feeding area and the feed processed during transport. In all of the assemblies disclosed herein, the farmer will experience little difficulty in selecting the best units from the various models and makes of mills, conveyors and other moving mechanisms for optimum performance.

The assemblies of the present invention offer means in a single unit to select, measure, mill, store and/or dispense appropriate feed mixtures with a minimum of labor and effort. It is to be observed that the assemblies include a minimum of exposed moving parts, gears, belt drives, thus affording considerable safety as well as savings in upkeep and costs.

I claim:

1. A feed processing assembly comprising a gravity feed tank, said tank having at least one separator defining separate compartments, each of said compartments having an inclined bottom terminating in gate means, said gate means leading to a common receiving area for dispensed feed, means for conveying feed from said area to a processing mill, and further means for moving processed feed from said processing mill to an elevated collector tank, said gravity feed tank includes an enclosed screw conveyor positioned substantially longitudinally and centrally of said gravity feed tank adjacent the inclined bottom, one end of the conveyor extending beyond said gravity feed tank to a material-receiving compartment and said conveyor being open at said one end to collect and remove material from said compartment.

2. The invention of claim 1 wherein said screw conveyor is arranged in substantial alignment with the inclined bottom whereby material is moved longitudinally.

3. A feed processing assembly comprising a gravity feed tank, said tank having at least one separator defining separate compartments, each of said compartments having an inclined bottom terminating in a gate means, said gate means leading to a common receiving area for dispensed feed, means for conveying feed from said area to a processing mill, and further means for moving processed feed from said processing mill to an elevated collector tank, said gravity feed tank is provided with inclined sides and the gate means leads to a lower channel, conveyor means in said channel for receiving and moving material, longitudinally of said gravity feed tank to the receiving area.

4. A feed processing assembly comprising a gravity feed tank, said tank having at least one separator arranged longitudinally of said gravity feed tank to divide same into a plurality of elongated compartments, each of said compartments having an inclined bottom terminating in gate means, said gate means leading to a receiving area for dispensing feed, an inclosed screw conveyor positioned substantially longitudinally and centrally of said gravity feed tank, one end of said conveyor extending beyond said gravity feed tank to said receiving area and said conveyor being open at one said end to collect and remove material from said area to a processing mill, said conveyor being arranged in substantial alignment with said inclined bottom to move material longitudinally, further means for removing processed feed from said processing mill to an elevated collector tank.

References Cited by the Examiner

UNITED STATES PATENTS

| | | | |
|---|---|---|---|
| 675,815 | 6/1901 | Clarke | 198—62 |
| 821,095 | 5/1906 | French | 241—101 |
| 2,299,702 | 10/1942 | Mosel | 222—129 |
| 2,813,704 | 12/1957 | MacKissic | 198—64 |
| 2,960,320 | 11/1960 | Heider | 198—64 |
| 3,128,894 | 4/1964 | Nelson | 198—64 |

References Cited by the Applicant

UNITED STATES PATENTS

| | | |
|---|---|---|
| 2,275,799 | 3/1942 | Oklejas. |
| 2,412,121 | 12/1946 | Bradshaw. |
| 2,815,941 | 12/1957 | Schmale. |
| 2,833,485 | 5/1958 | Rothhaar. |
| 2,894,733 | 7/1959 | Wosmek. |
| 2,939,592 | 6/1960 | Hoffstetter. |
| 2,982,484 | 5/1961 | Stahr. |

EVON C. BLUNK, *Primary Examiner.*

RICHARD E. AEGERTER, *Examiner.*